Dec. 20, 1938.    P. STEKETEE    2,140,861
SUPPORT FOR ELECTRICAL FIXTURES AND THE LIKE
Filed Aug. 23, 1937
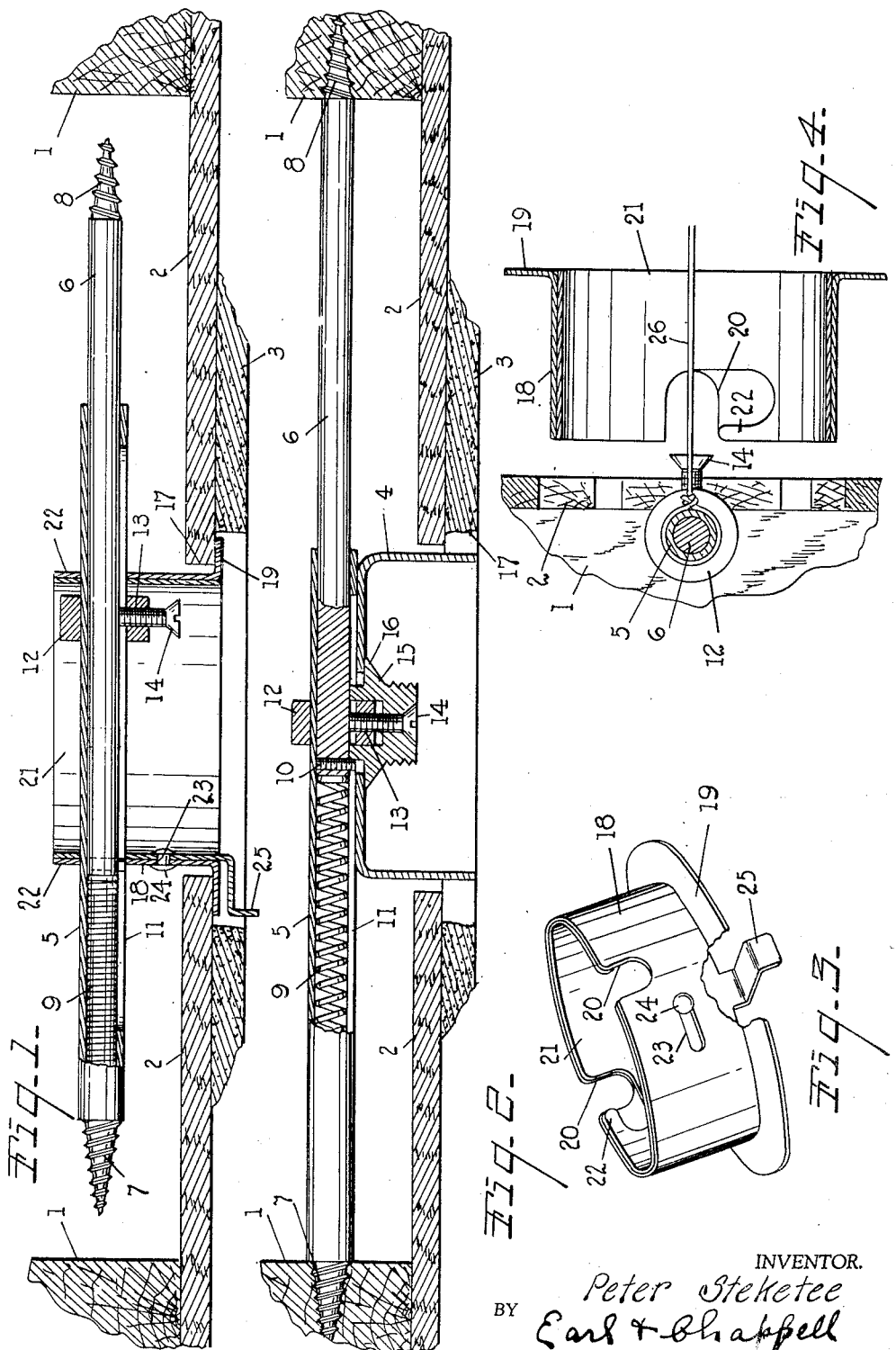
INVENTOR.
Peter Steketee
BY Earl + Chappell
ATTORNEYS Patented Dec. 20, 1938

2,140,861

UNITED STATES PATENT OFFICE 2,140,861

SUPPORT FOR ELECTRICAL FIXTURES AND THE LIKE

Peter Steketee, Holland, Mich.

Application August 23, 1937, Serial No. 160,427

13 Claims. (Cl. 247—22)

The main objects of this invention are:

First, to provide a support for electric fixtures which is easily installed in completed walls and ceilings and the like, and which is very rigid and stable after installation.

Second, to provide a structure of this character which has a wide range of adaptability.

Third, to provide in connection with a structure of the class described an apparatus for facilitating the installation thereof in proper position for use.

Objects pertaining to details and economies of my invention will definitely appear from the description to follow. The invention is defined in the claims.

A structure which embodies the features of my invention is clearly illustrated in the accompanying drawing in which:

Fig. 1 is a fragmentary sectional view illustrating preliminary steps in the positioning and installation of my improved anchor device or support.

Fig. 2 is a fragmentary sectional view illustrating my improved support with outlet box attached thereto in operative position in a ceiling.

Fig. 3 is a fragmentary perspective view of the assembling or positioning unit.

Fig. 4 is a fragmentary view illustrating a preliminary step in the assembling operation.

In the embodiment of my invention illustrated I have shown the same associated with a wall or ceiling. The joists or studding are indicated at 1, 1, the lath at 2, and the plaster at 3. 4 represents an outlet box of a commonly used type.

My improved fixture support comprises a pair of telescoping members 5 and 6, the member 5 being tubular to receive the member 6. These members 5 and 6 are provided with screws 7 and 8, respectively, one being a left hand screw and the other a right hand screw.

Within the member 5 is a coiled spring 9 acting to extend the members, a threaded lug 10 being provided in the member 6 to engage the slot 11 in the member 9 so that the parts must rotate together. The collar 12 is sleeved upon the member 5 and is provided with a hole 13 receiving the screw 14 by means of which the coupling 15 is secured to the support. This coupling is provided with a flange 16 engaging the outlet box 4.

In assembling the first operation is to form the hole 17 in the wall or ceiling. The support is then passed endwise through this opening and is brought into position transversely of the opening. Prior to introducing it through the opening, however, it is locked in its collapsed position by means of the screw 14 which acts as a set screw, see Fig. 1. After being properly positioned the screw may be released, allowing the spring 9 to extend the support until the screws engage the opposed joists or stud. The support is then rotated about its axis when, owing to the screws being reversely threaded, both will be screwed or drawn into the studding or joists as indicated in Fig. 2.

To facilitate the exact positioning of the supporting bar to receive and position the outlet box, I provide a positioning device consisting of an outer cylindrical member 18 having a positioning flange 19 on its lower edge adapted to engage the wall or ceiling around the opening 17 formed therein. This member has diametrically opposite notches 20 in its inner edge adapted to receive the bar.

A locking band or ring 21 is rotatively mounted within the member 18 and is provided with bayonet slots or openings 22 adapted to be brought into register with the openings 20 to receive the bar as shown in Fig. 3. A rotative movement of the locking ring brings the tongue portions 22 thereof into locking or retaining engagement with the supporting bar as shown in Fig. 1. The positioning member 18 is provided with a circumferential slot 23 receiving the headed stud 24 on the locking ring for retaining the parts in rotative engagement and limiting the rotative movement of the locking ring within the outer member. The locking ring is provided with a finger piece 25.

In the preferred manner of assembling the positioning device and the supporting bar are in position as indicated in Fig. 4 in which a cord 26 is attached to the supporting bar so that it cannot be lost or get out of reach within the wall after it has been introduced through the opening 17. The positioning unit is then engaged with the supporting bar and locked thereon after which it may be pushed inwardly to properly space and position the supporting bar so that, after screwing it into the studding, it will be in proper position to support the outlet box and the fixture to be attached thereto. After the positioning unit has been lifted or pushed inwardly until its flange engages the wall or ceiling the screw 14 is released, which allows the spring to extend the supporting bar until its screws are in engagement with the opposed studs or joist. The bar is then rotated to drive the screws as shown in Fig. 2, after which the positioning unit is disengaged, the collar 12 centrally positioned relative to the opening 17, the outlet box positioned, and the coupling 15 secured by means of the screw 14 which, as stated, not only serves to secure the outlet box but supports the coupling to which a fixture may be attached.

My improved fixture support is easily installed and is very secure and rigid after installation. It is unnecessary to make an opening in the wall or ceiling substantially larger than the outlet box or substantially larger than is necessary to receive the fixture The positioning unit enables very accurate positioning of the parts and the rapid performance of very uniform work.

I have illustrated and described my invention in a very simple and practical embodiment thereof. I have not attempted to illustrate or describe certain other embodiments or adaptations which I contemplate as it is believed this disclosure will enable those skilled in the art to embody or adapt my invention as may be desired.

Having thus described my invention, what I claim as new and desire to secure by Letters Patent is:

1. In a support for electrical fixtures and the like, the combination of a supporting bar comprising a pair of telescoping members each provided with an anchoring screw at its outer end, the screws being oppositely threaded, one of said members being tubular to receive the other and provided with a longitudinal slot, a spring within said tubular member acting to normally extend said members, a lug on the inner member engaging the said slot to prevent rotation of the members relative to each other, a collar sleeved upon the tubular member for longitudinal adjustment thereon, a coupling member slotted to receive said collar, and an attaching screw for said coupling member threaded into said collar and extending through said slot in said tubular member to engage the inner member and acting as a set screw for securing the parts in their adjusted position.

2. In a support for electrical fixtures and the like, the combination of a supporting bar comprising a pair of telescoping members each provided with an anchoring screw at its outer end, the screws being oppositely threaded, one of said members being tubular to receive the other and provided with a longitudinal slot, a spring within said tubular member acting to normally extend said members, a lug on the inner member engaging the said slot to prevent rotation of the members relative to each other, and a coupling member adjustably mounted on said supporting bar and provided with means for clamping it in its adjusted position.

3. In a support for electrical fixtures and the like, the combination of a supporting bar comprising a pair of telescoping members each provided with an anchoring screw at its outer end, the screws being oppositely threaded, one of said members being tubular to receive the other and provided with a longitudinal slot, a collar sleeved upon the tubular member for longitudinal adjustment thereon, a coupling member slotted to receive said collar, and an attaching screw for said coupling member threaded into said collar and extending through said slot in said tubular member to engage the inner member and acting as a set screw for securing the parts in their adjusted position.

4. In a support for electrical fixtures and the like, the combination of a supporting bar comprising a pair of telescoping members each provided with an anchoring screw at its outer end, the screws being oppositely threaded, one of said members being tubular to receive the other and provided with a longitudinal slot, and a coupling member adjustably mounted on said supporting bar and provided with means extending through the slot for clamping the coupling member in its adjusted position.

5. In an apparatus of the class described, the combination of a supporting bar comprising telescoping members, a spring acting to extend said members, and a coupling provided with a collar slidably engaging said bar and with a securing screw acting to clamp said collar in its adjusted position on said bar and to hold the members in retracted telescoped position relative to one another in opposition to the force of the spring.

6. In an apparatus of the class described, the combination of a supporting bar comprising telescoping members, a spring acting to extend said members, and a coupling adjustable on said bar and provided with securing means acting to secure said bar members in their extended position and to hold the same in retracted telescoped position relative to one another in opposition to the force of the spring 7. A device for installing a supporting bar within a wall structure, comprising an outer cylindrical member having a wall engaging flange at its outer end and having bar receiving notches in its inner edge, and a locking sleeve rotatably mounted within said outer member and having bayonet slots in its edge adapted to be brought into register with the notches in the outer member to receive the bar and acting to lock the bar when rotative movement is imparted thereto, said inner member being provided with a finger-piece whereby it may be adjusted to lock or release the bar, said bar being rotatable when the positioning device is engaged therewith.

8. A positioning means for extensible fixture supporting bars comprising a cylindrical holder member adapted to be inserted in an opening in a wall and provided with a wall engaging flange at its outer end and having bar receiving notches in its inner edge, and a locking member rotatably mounted on said holder member and having locking means adapted to close said notches with the bar therein for retaining the bar in said holder member while permitting rotation of the bar, said positioning means being open to permit the manipulation of the bar from within the positioning means.

9. A positioning means for extensible fixture supporting bars comprising a holder member adapted to be inserted in an opening in a wall and provided with a wall engaging flange at its outer end and having bar receiving notches in its inner edge, and a locking member mounted on said holder member and having locking means adapted to close said notches with the bar therein for retaining the bar in said holder member while permitting rotation of the bar, said positioning means being open to permit the manipulation of the bar from within the positioning means.

10. A positioning means for fixture supporting bars provided with studding engaging members actuated to an engaging position by a rotative movement of the bar, comprising a tubular holder member having bar receiving recesses in its inner end, and means for locking said holder member upon said bar, said holder member being provided with a wall engaging member at its outer end whereby the bar may be positioned within a wall, and said locking means being releasable from the outer end of said holder member whereby the holder member may be disengaged from the bar after the bar is secured in position within a wall.

11. A positioning means for fixture supporting bars provided with studding engaging members, comprising a tubular holder member having bar receiving recesses in its inner end, and means for locking said holder member upon said bar, said holder member being provided with a wall engaging member at its outer end whereby the bar may be positioned within a wall, and said locking means being releasable from the outer end of said holder member whereby the holder member may be disengaged from the bar after the bar is secured in position within a wall.

12. A positioning means for fixture supporting bars provided with studding engaging members actuated to an engaging position by a rotative movement of the bar, comprising a holder member having bar receiving parts at its inner end, and means for locking said holder member upon said bar, said holder member being provided with a wall engaging spacing member whereby the bar may be positioned with a wall and manipulated to secure it in its positioned relation within the wall.

13. A positioning means for fixture supporting bars provided with studding engaging members, comprising a holder member having bar receiving parts at its inner end, and means for locking said holder member upon said bar, said holder member being provided with a wall engaging spacing member whereby the bar may be positioned within a wall and manipulated to secure it in its positioned relation within the wall.

PETER STEKETEE.